United States Patent [19]

Kampf

[11] 4,024,767
[45] May 24, 1977

[54] SET POINT ADJUST MECHANISM FOR PROCESS CONTROLLERS

[75] Inventor: Richard S. Kampf, Costa Mesa, Calif.

[73] Assignee: Beckman Instruments, Inc., Fullerton, Calif.

[22] Filed: June 2, 1975

[21] Appl. No.: 583,232

[52] U.S. Cl. .............................. 73/432 A; 137/486; 137/487.5; 236/94; 318/626
[51] Int. Cl.² ...................... G05B 1/01; G05D 7/06
[58] Field of Search .............. 116/2; 318/626, 663; 236/94; 137/487.5, 486; 73/432 A; 74/529

[56] References Cited

UNITED STATES PATENTS

| | | | |
|---|---|---|---|
| 2,442,001 | 5/1948 | Hanna et al. | 318/626 |
| 2,911,577 | 11/1959 | Pignone | 318/663 |
| 2,956,447 | 10/1960 | McClure | 74/526 X |
| 3,054,297 | 9/1962 | Wells et al. | 318/626 |
| 3,271,643 | 9/1966 | Lingel | 318/626 |
| 3,329,821 | 7/1967 | Lesage | 318/663 X |
| 3,369,161 | 2/1968 | Kaufman | 318/626 X |
| 3,552,428 | 1/1971 | Pemberton | 137/487.5 |

Primary Examiner—Richard C. Queisser
Assistant Examiner—Daniel M. Yasich
Attorney, Agent, or Firm—R. J. Steinmeyer; D. A. Streck

[57] ABSTRACT

A set point adjust mechanism is disclosed for use with process controllers to manually adjust the set point value and simultaneously change the set point value indicated. The set point adjust mechanism includes a manually actuable thumbwheel and an idler wheel mounted in contact with each other on a slider. Thumb pressure on the thumbwheel causes the slider to move so that the idler wheel contacts an indicator drive wheel. The set point value source, usually a potentiometer, is connected to the indicator drive wheel which also drives a belt that positions a pointer with respect to a scale. The pointer and scale provide the set point indication. When the pointer hits a pointer stop, or for any other reason resists motion, further rotation of the thumbwheel causes the idler wheel to move to engage a mechanical stop to prevent further thumb pressure from causing dislocation between the indicated set point value and the set point value source.

5 Claims, 3 Drawing Figures

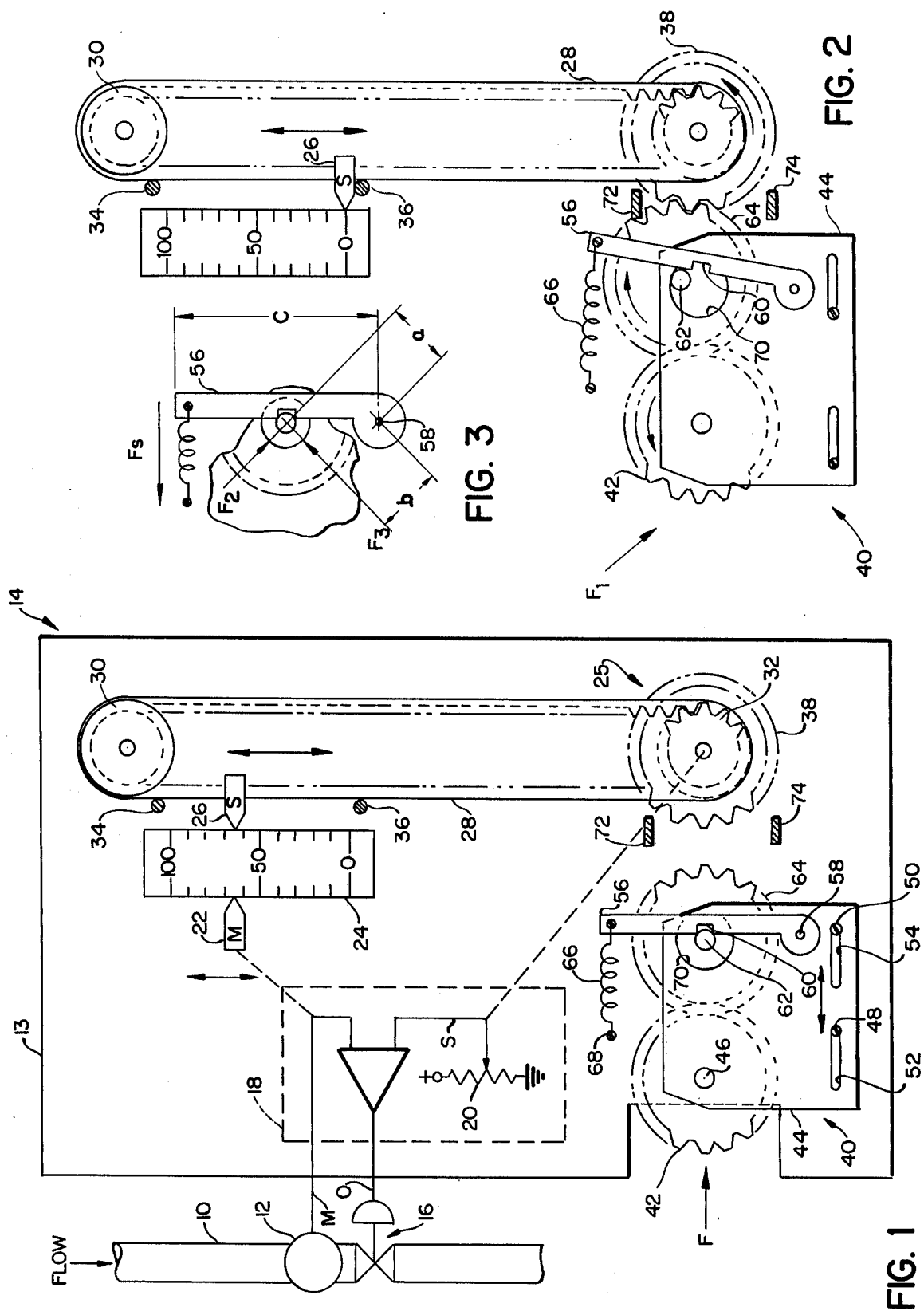

SET POINT ADJUST MECHANISM FOR PROCESS CONTROLLERS

BACKGROUND OF THE INVENTION

1. Field of the Invention

This invention relates to process control systems used to maintain a process parameter at a predetermined value or level, herein called the set point value. A measurement signal indicative of the present value of the parameter to be controlled is compared to a set point value signal. An error signal, related to the difference therebetween, is generated and used to adjust a final operator such as a valve, cooperating with the process to vary the parameter.

The set point source is typically a manually adjustable potentiometer connected to a D.C. voltage source. Even in installations in which the set point value source is provided by other means, such as a secondary controller in cascade configuration, or a digital computer in a Supervisory Control configuration, there is almost always provided a manual adjust mechanism to allow the human process operator to manually change the set point value. In the majority of such installations a set point value indicator is coupled to the set point value source to indicate the present value of the set point as an aid to the operator. In many cases the measurement signal is also displayed on the same scale for the operator's convenience.

2. Description of the Prior Art

In process control installations in which the set point value is indicated, it is extremely important that the indicated value be accurate. The difference between the indicated set point value and the indicated measurement value dictates the proper action to be taken by the process operator during initial start-up, modification of the process, or while under emergency conditions. It is therefore necessary to the safe operation of process installations to assure that the set point value is indicated accurately.

A conventional approach used to assure the accuracy of the set point value indication at a reasonable cost is to mechanically couple the set point value source to a drive wheel of the indicator assembly and couple the pointer to the drive wheel by a toothed belt. A thumbwheel is mounted on a slider, usually with an idler wheel, and the slider is biased out of contact with the drive wheel. Manual actuation of the thumbwheel moves the slider to allow the idler wheel to contact the drive wheel and transfer motion of the thumbwheel thereto. In this manner the set point value source and the set point value indicator are simultaneously adjusted. Resistance to motion exhibited by the pointer is allowed to cause slippage between the idler wheel and the indicator drive wheel, to prevent damage to the toothed belt and/or dislocation between the actual and indicated set point values.

In such conventional designs, however, increased thumbwheel pressure can overcome this frictional slippage and cause dislocation by continuing to drive the set point value source without causing a corresponding change in the set point value indicator.

Summary of the Invention

The present invention provides a positive locking mechanism to prevent such dislocation. The idler wheel is mounted on a slider in a manner which causes the idler wheel to move into engagement with a thumbwheel stop such as a locking pin, clamp or brake when the drive wheel exhibits resistance to motion due to sticking or pointer stoppage. The idler wheel is mounted to the slider by a notched lever biased to hold the idler wheel into continuous contact with the thumbwheel and into contact with the drive wheel when the thumbwheel is actuated. Resistance to motion of the drive wheel causes the force applied to the thumbwheel to overcome the mounting bias of the idler wheel. This force moves the idler wheel into engagement with the mechanical stop while retaining contact with both the thumbwheel and the drive wheel. the same biasing mechanism is conveniently utilized to bias the slider assembly out of contact with the drive wheel until the thumbwheel is actuated. The thumbwheel, idler wheel and drive wheel are preferably toothed gears so that locking of the idler wheel may be accomplished without reliance on friction.

BRIEF DESCRIPTION OF THE DRAWINGS

FIG. 1 shows in schematic form a process control loop including a flowmeter, valve and operator and a process controller having a set point adjust mechanism according to the instant invention shown in its normal operating position.

FIG. 2 shows the set point adjusting mechanism of FIG. 1 in its locked position.

FIG. 3 shows the forces applied to the axle of the idler wheel in the set point adjusting mechanism of FIG. 1 in its normal operating position.

DETAILED DESCRIPTION OF A PREFERRED EMBODIMENT

Fig. 1 shows a process control loop untilized to control the flow rate of fluid in pipeline 10. A measurement signal related to flow rate is generated by flowmeter 12. This measurement signal is utilized by a process controller, shown generally at 14, to generate an output signal used to adjust the rate of flow in pipe 10 by manipulation of valve and valve operator 16. The signal handling portion of controller 14 is shown schematically as circuitry 18 which may be electronic, fluidic or pneumatic signal handling circuitry. Circuitry 18, which is mounted on controller baseplate 13, generates the output signal (0) typically as a function of the deviation between the measurement signal (M) and a set point value signal (S) generated by set point value source 20. Process controllers generally include more detailed circuitry to perform additional signal manipulation functions not relevant to the instant invention. The value of the measurement signal generated by flowmeter 12 is indicated in a conventional manner by positioning measurement pointer 22 with respect to scale 24. The drive mechanism for pointer 22 is not shown herein and forms no part of the instant invention. In a manner described hereinbelow, set point pointer 26 is also positioned with respect to scale 24 by indicator drive assembly 25 to indicate the value of the set point signal generated by set point value source 20.

The mechanisms described hereinbelow are all mounted on controller baseplate 13. Pointer 26 is carried on toothed drive belt 28 which is mounted between upper pulley 30 and toothed lower pulley 32. Pointer 26 may indicate values from 0% to 100%, or any other convenient scale, and is limited in its travel in the upper position by pointer stop 34 and in the lower position by pointer stop 36. Lower pulley 32 is connected to drive wheel 38 which is also mechanically linked to set point value source 20. Source 20 is schematically shown herein as a potentiometer connected to a source of D.C. voltage (not shown). Pulley 32 and drive wheel 38 may simply be axially mounted to the shaft of potentiometer 20. It is obvious, therefore, that rotation of drive wheel 38 causes a change in both the set point signal generated by potentiometer 20 and the value indicated by pointer 26.

The process operator can manually adjust the set point value by means of set point adjust mechanism 40, mounted on base 13, which causes rotation of drive wheel 38. Set point adjust mechanism 40 includes thumbwheel 42 mounted for rotation to slider 44 by axle 46. Motion of slider 44, which may be a simple metal plate, is controlled by pins 48 and 50 attached to base 13 moving in slots 52 and 54. As shown in FIG. 1, this allows force F exerted by a process operator's thumb to move slider 44 to the right of the position shown in FIG. 1.

Notched lever 56 is mounted to slider 44 by means of pin 58. It must be noted that pin 58 does not extend through slider 44 to contact base 13. Notch 60 in lever 56 serves as a mounting for axle 62 of idler wheel 64 and engages axle 62 over an arc of about 65°. Spring 66, mounted to pin 68 which is affixed to base 13, serves to bias lever 56 so that idler wheel 64 is miantained in contact with thumbwheel 42. In addition, spring 66 also serves to maintain slider 44 in its leftmost position as shown, in the absence of force F. Notch 60 serves to hold idler wheel 64 in the central position as shown in FIG. 1. Pin 58, which is the pivot point for rotation for lever 56, is vertically below the axis of rotation of axle 62 in the position shown. The centering forces, explained below with reference to FIG. 3, maintained idler wheel 64 in the position shown in FIG. 1 because hole 70 in slider 44 is of significantly greater diameter than axle 62.

Upper and lower mechanical stops 72 and 74, which may be locking pins shaped to mesh with the teeth of gear 64 or frictional brakes or clamping mechanisms, are positioned so as not to interfere with rotation of idler wheel 64 in either the normal operating position shown in FIG. 1 or upon actuation of set point adjust mechanism 40 by the application of force F thereto during normal operating conditions. The instant invention and the operation of stops 72 and 74 may most easily be described with reference to FIG. 2 which shows a portion of controller 14, including set point adjust mechanism 40, under conditions which might otherwise cause dislocation. In FIG. 2 pointer 26 is shown in its lowermost position indicating a set point value of 0%. Pointer 26 is prevented from further downward motion by lower limit stop 36.

If the process operator attempted, by application of force F1, to adjust the set point value to a lower level, set point adjust mechanism 40 would prevent dislocation in the following manner.

Application of force F1 moves slider 44 to its rightmost position as shown. Force F1 tends to cause rotation of thumbwheel 42, idler wheel 64 and drive wheel 38 in the directions shown by the arrows. However, this rotation is resisted by stop 36. In order to prevent dislocation, which would occur if force F1 was allowed to adjust set point value source 20 below the value shown, the forces applied to axle 62, as explained below, cause idler wheel 64 to overcome the mounting bias of lever 56. Idler wheel 64, in firm contact with both thumbwheel 42 and drive wheel 38, rides vertically upward out of notch 60 until the periphery of wheel 64 contacts upper stop 72. Stop 72 provides a positive locking force preventing further rotation of thumbwheel 42, and thereby prevents dislocation. The application of a force greater than F1 serves only to more positively lock idler wheel 64 against stop 72. In this manner it can be seen that set point adjust mechanism 40 effectively prevents dislocation because an attempt to drive pointer 26 past stop 36 causes idler wheel 64 to be moved into contact with stop 72.

The forces applied to axle 62 are shown in FIG. 3. $F_s$ is the force applied by spring 66 and distance C is the effective moment arm of lever 56. Reaction forces F2 and F3 resulting from force $F_s$ are as shown. Placement of pin 58 vertically below the axis of rotation of idler wheel 64 causes moment arms $a$ and $b$ of forces F2 and F3, respectively, to be equal. This means that F2 and F3 are equal because F2 ($a$) and F3 ($b$) must both be equal to $F_s C$. In this manner it can be seen that the force required to cause wheel 64 to ride vertically out of notch 60 is the same in both directions. These forces are both related to $F_s$ so that the force required to "trip" the device may be adjusted by adjusting spring force $F_s$. The relationship between the size and shape of notch 60 to axle 62 is also a factor affecting the magnitude of this force.

It is obvious that the same result would occur if pointer 26 was in its uppermost position indicating 100% of scale because limit stop 34 would cause drive wheel 38 to resist further rotation thereby moving idler wheel 64 out of the position shown in FIG. 1 to contact stop 74.

It should be noted that a similar result will occur if for any other reason pointer 26 is unable to move. This could occur from any one of a number of different sources of unwanted mechanical interference such as binding or sticking.

Dislocation may occur in the instant invention if drive wheel 38 could be rotated against the resistance of belt 28. This cannot occur if the forces maintaining wheel 64 in the position shown in FIG. 1 are overcome before the forces maintaining contact between belt 28 and pulley 32 are overcome.

I claim:
1. Apparatus for the simultaneous moving of two devices operably connected to and moved by a driven gear to prevent dislocation between the positions of the two devices when the motion of one of the devices or the driven gear is impeded, the apparatus comprising:
   a. a driving gear adapted to engage the driven gear;
   b. releasable bias means for releasably holding said driving gear in a first position and allowing said driving gear to move normal to its axis from said first position to a second position in response to the driven gear attaining a level of resistance to movement sufficient to cause said driving gear to overcome the force of said bias means; and,
   c. mechanical stop means for engaging said driving gear only when said driving gear reaches said second position to prevent further rotation of said driving gear.

2. The apparatus of claim 1 wherein said bias means comprises:
   a. a notched lever for engaging said driving gear adjacent its axis; and,
   b. spring means operably connected to said lever for biasing the notch against said gear.

3. Apparatus for the simultaneous moving of a mechanically adjustable variable and a pointer both mechanically connected to a common toothed driven wheel to prevent dislocation between the pointer and the variable when the motion of either is impeded, the apparatus comprising:
  a. a toothed driving wheel having an axle and adapted to engage the toothed driven wheel;
  b. a notched lever adapted to engage said axle in the notch of said notched lever whereby said driving wheel is held in a first position;
  c. bias means connected to said notched lever for releasably holding said notch against said axle, said bias means being adapted to allow said axle of said driving wheel to disengage said notch to allow said driving wheel to move normal to its axis from said first position to a second position in response to said driven wheel attaining a level of resistance to movement sufficient to cause said axle to overcome the force of said bias means and move out of said notch;
  d. mechanical stop means for engaging the teeth of said driving wheel when said axle of said driving wheel is out of said notch and said driving wheel is in said second position; and,
  e. a slider carrying said driving wheel and said notched lever, said slider being movable between a first position wherein said driving wheel engages the driven wheel and a second position wherein said driving wheel does not engage the driven wheel.

4. Apparatus as claimed in claim 3 wherein:
  said bias means is adapted to bias said slider in said second position.

5. Apparatus for the simultaneous positioning of a mechanically adjusted variable and a pointer indicating on a scale the value or position of said variable and preventing dislocation between the pointer and the variable when the motion of either is impeded, the apparatus comprising:
  a. a base plate;
  b. a toothed drive wheel mounted on said base plate for rotary motion about an axle;
  c. mechanical linkage means connecting said axle of said drive wheel to the shaft of the mechanically adjusted variable;
  d. a toothed first pulley carried by said axle of said drive wheel;
  e. a second pulley mounted on said base plate for rotary motion;
  f. a toothed drive belt operably connected between said first pulley and said second pulley, said belt carrying the pointer adjacent the scale;
  g. a slider mounted on said base plate in spaced relationship thereto and adapted for movement between a first position adjacent said drive wheel and a second position away from said drive wheel, said slider having a hole adjacent the edge of said slider closest said drive wheel;
  h. a toothed thumbwheel mounted on said slider for rotary motion, said thumbwheel having an axle and being disposed with its axle adjacent the edge of said slider opposite said hole;
  i. a notched lever mounted on said slider for pivotal motion about a pin, the notch in said lever being disposed over said hole and opening toward said thumbwheel;
  j. a spring connected between said lever and said base plate, said spring urging said lever toward said thumbwheel, said spring further urging said slider away from said drive wheel;
  k. a toothed idler wheel having an axle, said axle of said idler wheel passing through said hole in said slider and being engaged in said notch in said lever whereby said idler wheel will rotate with said axle in said notch when said thumbwheel is rotated, said idler wheel engaging said drive wheel when said slider in said position adjacent said drive wheel, said idler wheel adapted to overcome the force of said spring on said lever when the drive wheel attains a preselected level of resistance to rotation causing said axle of said idler wheel to move out of said notch and rotate about the periphery of said drive wheel; and,
  l. a locking pin mounted on said base plate, said locking pin being disposed to clear the teeth of said idler wheel when said axle of said idler wheel is in said notch and engage the teeth of said idler wheel to prevent further rotation of said idler wheel when said axle of said idler wheel is out of said notch.

* * * * *